United States Patent [19]

Pusic et al.

[11] Patent Number: 4,902,062
[45] Date of Patent: Feb. 20, 1990

[54] ELECTRICALLY DRIVEN SUN VISOR

[76] Inventors: Pavo Pusic, Moluntska 6, Dubrovnik, Yugoslavia, 50000; Palma M. Puzzuoli, 17 Oxford Dr., East Hanover, N.J. 07936

[21] Appl. No.: 297,680

[22] Filed: Jan. 18, 1989

[51] Int. Cl.⁴ .............................................. B60J 3/02
[52] U.S. Cl. ................................... 296/97.4; 296/97.8
[58] Field of Search .................... 296/97.4, 97.8, 97.6, 296/97.9, 97.11; 160/370.2

[56] References Cited

U.S. PATENT DOCUMENTS

| | | | |
|---|---|---|---|
| 2,134,414 | 10/1938 | Norcross | 296/97.4 |
| 3,226,151 | 12/1965 | Renther | 296/97.4 |
| 3,343,868 | 9/1967 | Manookian | 296/97.4 |
| 3,363,666 | 1/1968 | Dodgson et al. | 296/97.4 |
| 4,697,843 | 10/1987 | Tomforde | 296/97.4 |
| 4,728,142 | 3/1989 | Gavagan | 296/97.8 |

Primary Examiner—Robert R. Song

[57] ABSTRACT

An electrically driven sun visor for motor vehicles providing the possibility for length adjustment, is disclosed.

5 Claims, 2 Drawing Sheets

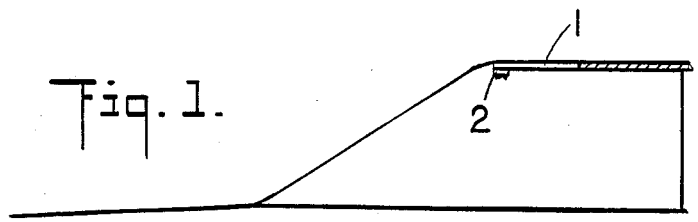
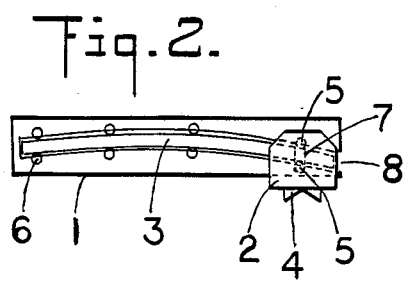
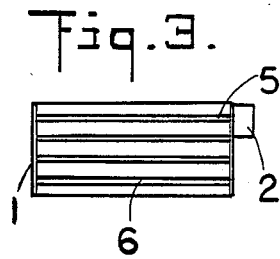
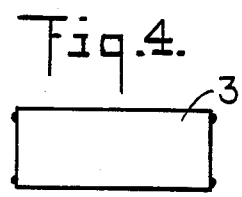
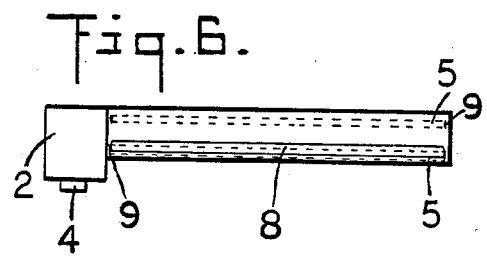
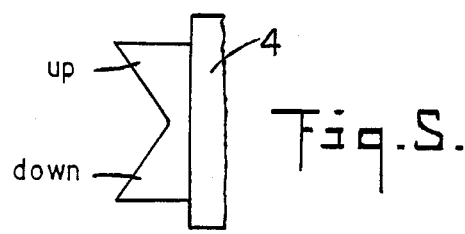

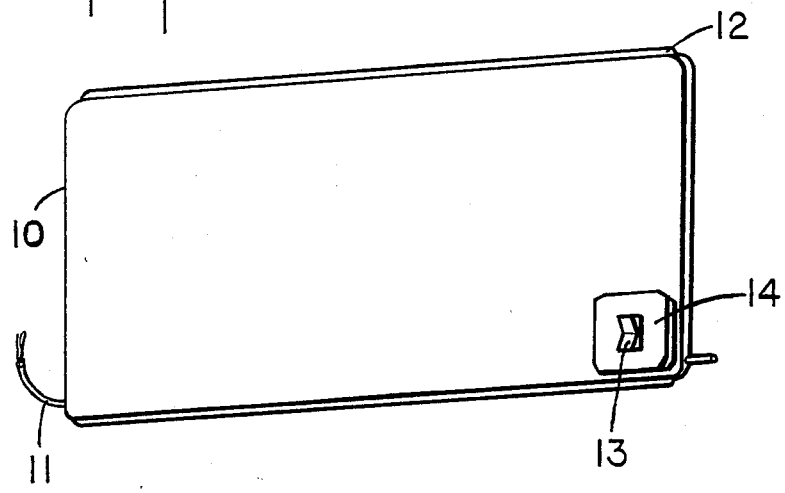
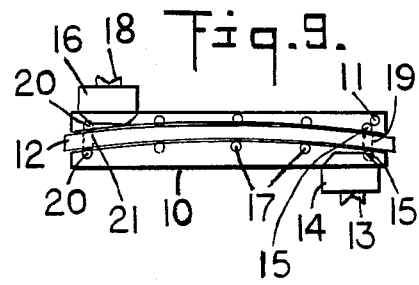
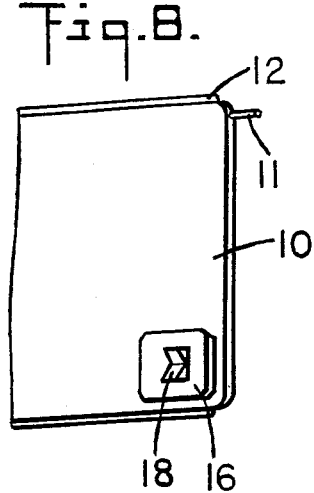

ELECTRICALLY DRIVEN SUN VISOR

BACKGROUND OF THE INVENTION

The present invention relates to sun visors for driver's or passenger's protection from sun rays, which are built in different types of motor vehicles.

The devices known in the prior art are all of the type which have to be moved manually and rotate up and down on an axle attached on the vehicle's ceiling. These devices are of a certain unchangable length and width and, therefore, do not provide correct protection in relation to the height of a driver or passenger. Thus, it is common that the standard length of the visor is too short for a short driver and too long for a tall driver, which in both cases does not provide proper protection and influences driving safety. Visors in the prior art which provide the possibility for different lengths, such as one approved by U.S. Pat. No. Des. 297,227, appear to be complicated, impractical and a safety hazard because of too much time needed to adjust the length during driving.

SUMMARY OF THE INVENTION

It is an object of the present invention to provide a device which will enable a driver or passenger to adjust the length of the visor according to the individual's height and the sun ray's angle, and obtain the best possible protection without having any negative influence on the driver's visibility range. It is also the object of the present invention to increase safety due to the much shorter time needed to adjust the visor and to eliminate the need for tinted glass on on the upper part the windshield, which has a harmful effect on human eyesight Due to its compact design, the present invention will not influence vehicle shape and will demand only as much volume as existing sun visors.

It is also an object of the present invention to provide two versions of the invention.

BRIEF DESCRIPTION OF DRAWINGS

FIG. 1 is a graph showing the location of the invention with respect to the vehicle's roof and windshield.

FIG. 2 is the right side cutaway view of the invention located on the driver's side of a vehicle.

FIG. 3 is the top view of the lower part of the invention's housing.

FIG. 4 is the top view of the sliding panel.

FIG. 5 is the side view of the switch.

FIG. 6 is the front view of the invention's housing.

FIG. 7 is a graph showing the perspective view of the invention for "version two".

FIG. 8 is the perspective view of the invention for "version two", showing the opposite side of the invention as it appears when the invention is in its lower position.

FIG. 9 is the right side cutaway view of the invention located on the driver's side of a vehicle for "version two".

FIG. 10 is a graph showing the lower position of the invention when used for vehicle's interior protection for "version two".

DETAILED DESCRIPTION OF THE PREFERRED EMBODIMENT

As shown on FIG. 1, the present invention's housing 1, which is a box of rectangular shape, is located under a metal roof of a motor vehicle on the same location as existing sun visors. The housing 1 which is attached on a car's metal roof comprises electric motor 2, sliding panel 3, electric switch 4, rubber cylinders 5, plastic cylinders 6, and transmission belt 7. On its front side, which is located towards the windshield, the housing 1 has an opening 8 through which said panel 3 is driven out and into said housing 1.

When in starting position, as shown on FIG. 2, said sliding panel 3 is located inside the housing 1 and pressed by two rubber cylinders 5 which hold the panel 3 stationary and prevent it from sliding out of the housing 1. Two said rubber cylinders 5 are connected on the electric motor 2 by the transmission belt 7 and they rotate according to rotation of said electric motor 2. The plastic cylinders 6, built deeper inside the housing 1, are not connected on the electric motor 2 and they rotate freely enabling smooth sliding of the panel 3. When desired, the driver or passenger activates the electric motor 2 by pushing the "down" side of the electric switch 4 which causes electric motor 2 to drive the panel 3 out of the housing 1 through the opening 8 in a parallel position with respect to the windshield. The panel 3 is driven out for as long as desired up to a maximum length of the panel 3, when the electric motor 2 automatically stops according to signal activated by the panel's elevated end-points. According to the described procedure, the panel 3 can be driven out and left in any position which provides the best protection against incoming sun rays, and which is the most suitable for driver or passenger. When desired, the panel 3 is driven inside the housing 1 by pushing the "up" side of the electric switch 4 which causes the electric motor 2 to turn in the opposite direction. During this procedure the electric motor 2 also stops in any position when said electric switch is relased and automatically stops when panel 3 reaches its ultimate upper position.

It is assumed that two said devices are built-in under the vehicle's roof; one on the left side for the driver's protection, and one on the right side for the front passenger's protection. Both of the devices 1 have the same shape and operate independently with the difference that the electric motors 2 are located on the opposite sides of the housings 1 for the purpose of providing a more symmetrical design. In this case, the electric switch 4 on the driver side will be operated by the driver's right hand, and the switch 4 on the passenger's side will be operated by the passenger's left hand. It is also assumed that both panels 3 can be driven by the single electric motor 2 located in the middle of both housings 1, if proven more suitable for the purpose of the present invention.

It is to be understood that the present invention can be built above vehicle's side windows and provide protection from the sun rays coming under any angle from the left or right side with respect to vehicle's longitudinal axis. It is also to be understood that the present invention in a slightly different configuration, which will depend on the vehicle's roof and windshield design, can be used both for front and back windshield protection, as today provided by different types of shades which cover the entire windshield and protect the vehicle's interior from incoming sun rays.

As shown on FIGS. 7, 8, 9 and 10, the present invention can be built in configuration as shown on said figures, referred as "version two" in this text. In this case, the present invention uses the housing 10, FIGS. 7, 8 and 9, which has the same shape as existing sun visors and is attached to the vehicle's roof in the same manner as existing sun visors. As shown on FIG. 9, the present invention comprises two electric motors 14 and 16 located on the opposite sides of the housing 10, four rubber cylinders 15 and 20 connected to said motors 14 and 16 by transmission belts 19 and 21. Said housing 10 further comprises sliding panel 12 which can be driven out and inside the housing 10 through the openings on both sides of the housing 10, and which slide over the plastic cylinders 17. As for the difference in relation to the previously described procedure, in case of "version two" sliding panel 12 is slightly longer than the housing 10 in order to cover more space behind a windshield. The "version two" is designed to provide both protection from sun rays when driving, and protection of vehicle's interior when vehicle is parked.

For the purpose of protection from sun rays when driving, the sliding panel 12 is driven outside and inside of the housing 10 as described in the previous procedure. In this case, the electric motor 14 is activated by pushing the electric switch 13 and it drives said panel 12 into desired position. The motor 14 automatically stops when the panel 12 reaches its ultimate lower or upper position.

For the purpose of protecting the vehicle's interior when vehicle is parked, according to the procedure for "version two", the entire housing 10 is manually lowered towards the windshield by rotating it about the pivot axle 11. This procedure corresponds to the procedure performed in order to lower today's sun visors.

When the housing 10 is lowered in position parallel to a windshield, by pressing the electric switch 18 driver activates the electric motor 16 which drives the panel 12 out of the housing 10 toward vehicle's dashboard. Since the sliding panel 12 now covers additional space, together with the housing 10 it covers a substantial part of the windshield as shown on FIG. 10. This prevents heating of vehicle's dashboard, steering wheel and front seats by all sun rays which come under the angle anywhere between 50 and 90 degrees, i.e. during the hottest time of the day. Before driving the vehicle again, driver first activates electric motor 16 which drives the panel 12 inside the housing 10, and manually turns the housing 10 into the position under vehicle's roof.

When manually turned down and left or right (depending on which side invention is located) the present invention for "version two" can be used as protection of sun rays which are coming through vehicle's windows as performed with today's sun visors. It is assumed that the housing 10 for "version two" can be driven in lower and upper position by electrical means, instead of manual turning, if proven more efficient for the purpose of the present invention.

It is also assumed that said sliding panels 3 and 12 for any version of the present invention can be built as an opaque screen or of tinted glass, and that the shape of the panels should prevent them from touching the windshield or window when driven outside of housings.

It will be understood that the present invention has been described in relation to the particular embodiment, herein chosen for the purpose of illustration, and that the claims are intended to cover all changes and modifications, apparent to those skilled in the art which do not constitute departure from the scope and spirit of the invention.

What is claimed is:

1. An electrically operated sun visor apparatus for a vehicle having a roof and a windshield, comprising:

a hollow housing having a curved internal storage compartment for storing a sliding panel in a retracted position, said storage compartment including driving cylinders and supporting cylinders, each of said cylinders arranged along both horizontal walls of said storage compartment in a line parallel to the longitudinal extension of said housing, said housing externally shaped in a rectangular prism form and horizontally mounted beneath a front edge of the vehicle roof on either side of said vehicle parallel to the longitudinal extension of said vehicle windshield;

said sliding panel having elevated end-points and the same curvature as said storage compartment, said curvature being approximately equal to the curvature of the vehicle windshield, said sliding panel mounted inside said storage compartment between said driving and said supporting cylinders and driven into extended position by said driving cylinders over said supporting cylinders.

2. The apparatus according to claim 1, wherein said housing having an opening, the housing further comprises:

manually controllable electrical means coupled to said driving cylinders for rotating said driving cylinders and controlling sliding of said sliding panel;

automated means coupled to said electrical means and said driving cylinders for automated stopping of said panel when said panel approaches said ultimate extended or retracted position.

3. An electrically and manually operated sun visor apparatus for a vehicle having a roof and a windshield, comprising:

a rectangularly shaped, hollow apparatus housing having a curved internal storage compartment for storing a sliding panel in a retracted position, said storage compartment including driving cylinders and supporting cylinders, said driving cylinders arranged along both walls of said storage compartment in proximity to both longitudinal edge sections of said housing and parallel to the longitudinal extension of said housing, said supporting cylinders arranged along inner portion of both said walls of said storage compartment in a parallel line to the longitudinal extension of said housing, said housing being rotatable about a pivot axle provided along one longitudinal edge section of said housing and mounted on said vehicle roof in a proximity of said vehicle windshield;

said sliding panel having the same curvature as said storage compartment, said sliding panel mounted inside said storage compartment between said driving and said supporting cylinders and driven into extended positions and back into the retracted position by one pair of said driving cylinders over said supporting cylinders.

4. The apparatus according to claim 3, wherein said housing having openings, the housing further comprises:

manually controllable electrical means coupled to said driving cylinders for rotating said driving cylinders and controlling sliding of said sliding panel;

automated means coupled to said electrical means and to said driving cylinders for automated stopping of said sliding panel when said panel approaches an upper extended or a lower extended position.

5. A method of operating a sun visor apparatus adapted for electrical displacing of a sliding panel and manual displacement of an apparatus housing, comprising the steps of:

displacing said sliding panel into an extended position when said apparatus housing is in a retracted position by energizing a first electrical means coupled to a first pair of driving cylinders located in the front section of said apparatus housing;

manually displacing said apparatus housing into an extended position by rotating said apparatus housing about a pivot axle and then displacing said sliding panel into the extended position by energizing a second electrical means coupled to a second pair of driving cylinders located in the lower section of said apparatus housing.

* * * * *